United States Patent
Weis et al.

(10) Patent No.: US 12,367,477 B2
(45) Date of Patent: Jul. 22, 2025

(54) SECURE PAYMENT USING A RADIO FREQUENCY IDENTIFICATION (RFID) ENABLED REMOTE CONTROL

(71) Applicant: ROKU, INC., San Jose, CA (US)

(72) Inventors: David Ph. Weis, Bee Cave, TX (US); Jason A. Korosec, Saratoga, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/228,402

(22) Filed: Jul. 31, 2023

(65) Prior Publication Data

US 2025/0045726 A1    Feb. 6, 2025

(51) Int. Cl.
| | |
|---|---|
| G06Q 20/32 | (2012.01) |
| G06Q 20/12 | (2012.01) |
| G06Q 20/22 | (2012.01) |
| G06Q 20/34 | (2012.01) |
| G06Q 20/40 | (2012.01) |
| H04N 21/4185 | (2011.01) |

(Continued)

(52) U.S. Cl.
CPC ....... G06Q 20/3278 (2013.01); G06Q 20/123 (2013.01); G06Q 20/227 (2013.01); G06Q 20/352 (2013.01); G06Q 20/40145 (2013.01); H04N 21/4185 (2013.01); H04N 21/42221 (2013.01); H04N 21/42222 (2013.01); H04N 21/431 (2013.01); H04N 21/441 (2013.01)

(58) Field of Classification Search
CPC ............. G06Q 20/3278; G06Q 20/227; G06Q 20/352; G06Q 20/40145; H04N 21/4185; H04N 21/42221; H04N 21/42222; H04N 21/431; H04N 21/441
See application file for complete search history.

(56) References Cited

U.S. PATENT DOCUMENTS 9,219,932 B2 * 12/2015 Steyer ................ H04N 21/2543
11,055,683 B1 * 7/2021 Bartholomew ...... G06Q 20/341
(Continued)

FOREIGN PATENT DOCUMENTS

EP      2608177 A1     6/2013

OTHER PUBLICATIONS

Extended European Search Report directed to related European Application No. 24190140.4, mailed Jan. 7, 2025; 8 pages.

Primary Examiner — Nnenna N Ekpo
(74) Attorney, Agent, or Firm — Sterne, Kessler, Goldstein & Fox P.L.L.C.

(57) ABSTRACT

Disclosed herein are system, apparatus, device, method and/or computer program product embodiments, and/or combinations and sub-combinations thereof, for using radio frequency identification (RFID) enabled remote control for providing payment information for the media systems. An example embodiment operates by a computer-implemented method. The method includes receiving, by at least one computer processor of a media device, payment information from a remote control. The payment information is received at the remote control using an RFID reader module of the remote control. The method further includes promoting an authentication request and receiving an authentication response in response to the authentication request. The method further include transmitting the payment information to a server for further processing in response to the authentication response satisfying a condition.

20 Claims, 7 Drawing Sheets

(51) Int. Cl.
*H04N 21/422* (2011.01)
*H04N 21/431* (2011.01)
*H04N 21/441* (2011.01)

(56) References Cited

U.S. PATENT DOCUMENTS

| | | | |
|---|---|---|---|
| 2013/0148024 A1* | 6/2013 | Shin | H04N 21/42204 |
| | | | 705/44 |
| 2018/0348967 A1* | 12/2018 | Kondrk | G06F 3/0482 |
| 2020/0160317 A1* | 5/2020 | Johnson | G07F 7/0886 |
| 2020/0193506 A1* | 6/2020 | Hall | G06Q 20/227 |
| 2021/0272090 A1* | 9/2021 | Shimode | G06F 21/71 |

* cited by examiner

SECURE PAYMENT USING A RADIO FREQUENCY IDENTIFICATION (RFID) ENABLED REMOTE CONTROL

BACKGROUND

Field

This disclosure is generally directed to methods and systems for providing payment information for media systems, and more particularly to methods and systems for using Radio Frequency Identification (RFID) enabled remote control for providing payment information for the media systems.

SUMMARY

Provided herein are system, apparatus, article of manufacture, method and/or computer program product embodiments, and/or combinations and sub-combinations thereof, for providing payment information for media systems. For example, system, apparatus, article of manufacture, method and/or computer program product embodiments, and/or combinations and sub-combinations thereof are provided for using Radio Frequency Identification (RFID) enabled remote control for providing payment information for the media systems.

An example embodiment operates by a computer-implemented method. The method includes receiving, by at least one computer processor of a media device, payment information from a remote control. The payment information is received at the remote control using a radio frequency identification (RFID) reader module of the remote control. The method further includes promoting an authentication request and receiving an authentication response in response to the authentication request. The method further include transmitting the payment information to a server for further processing in response to the authentication response satisfying a condition.

The method can further include providing one or more payment method options, receiving a payment method selection, and transmitting an activation signal to the remote control to active the RFID reader module in response to the payment method selection.

The authentication request can include a request for address information, a request for a security code, or a request for biometric information.

The method can further include displaying a failure message on a display device associated with the media device in response to the authentication response not satisfying the condition.

The method can further include displaying, on a display device associated with the media device, one or more payment method options and displaying, on the display device associated with the media device, an instruction screen in response to the payment method selection.

The payment information can be associated with an RFID enabled credit card and/or with a digital wallet of an RFID enabled device.

The method can further include encrypting the payment information before transmitting the payment information to the server for further processing.

An example embodiment operates by a non-transitory computer-readable medium having instructions stored thereon that, when executed by at least one computing device of a media device, cause the at least one computing device to perform operations. The operations can include receiving payment information from a remote control, where the payment information is received at the remote control using a radio frequency identification (RFID) reader module of the remote control. The operations can further include promoting an authentication request and receiving an authentication response in response to the authentication request. In response to the authentication response satisfying a condition, transmitting the payment information to a server for further processing.

An example embodiment operates by a system including one or more memories and at least one processor each coupled to at least one of the memories. The at least one processor is configured to perform operations including receiving payment information from a remote control, where the payment information is received at the remote control using a radio frequency identification (RFID) reader module of the remote control. The operations further includes promoting an authentication request and receiving an authentication response in response to the authentication request. The operations also includes transmitting the payment information to a server for further processing in response to the authentication response satisfying a condition.

An example embodiment include a remote control including a radio frequency identification (RFID) reader module configured to communicate with an RFID tag and a transceiver configured to communicate with a media device. The remote control further includes at least one processor configured to receive, using the RFID reader module, payment information from the RFID tag and transmit, using the transceiver, the payment information to the media device.

The at least one processor can further be configured to receive, using the transceiver, an activation signal from the media device and transition the RFID reader module from a passive mode to an active mode.

The at least one processor can be further configured to transmit an authentication response to the media device, where the authentication response can include one or more of a zip code, a security code, or biometric information. The at least one processor can also be further configured to encrypt the payment information before transmitting, using the transceiver, the payment information to the media device.

BRIEF DESCRIPTION OF THE FIGURES

The accompanying drawings are incorporated herein and form a part of the specification.

In the drawings, like reference numbers generally indicate identical or similar elements. Additionally, generally, the

DETAILED DESCRIPTION

A user of a media system can purchase content (such as, but not limited to, TV shows, movies, or the like), subscriptions, merchandise, or the like using the media system. For example, the user can purchase content, subscriptions, merchandise, or the like using the media device and through the user's TV. For example, the user can enter credit card information using the pad on a remote control. Entering the credit card information such as credit card number, expiration date, billing address, or the like using the pad on the remote control can be inconvenient and time consuming, and can introduce errors in the information provided.

Provided herein are system, apparatus, device, method and/or computer program product embodiments, and/or combinations and sub-combinations thereof, for using RFID enabled remote control for providing payment information for the media systems.

Figure 1:
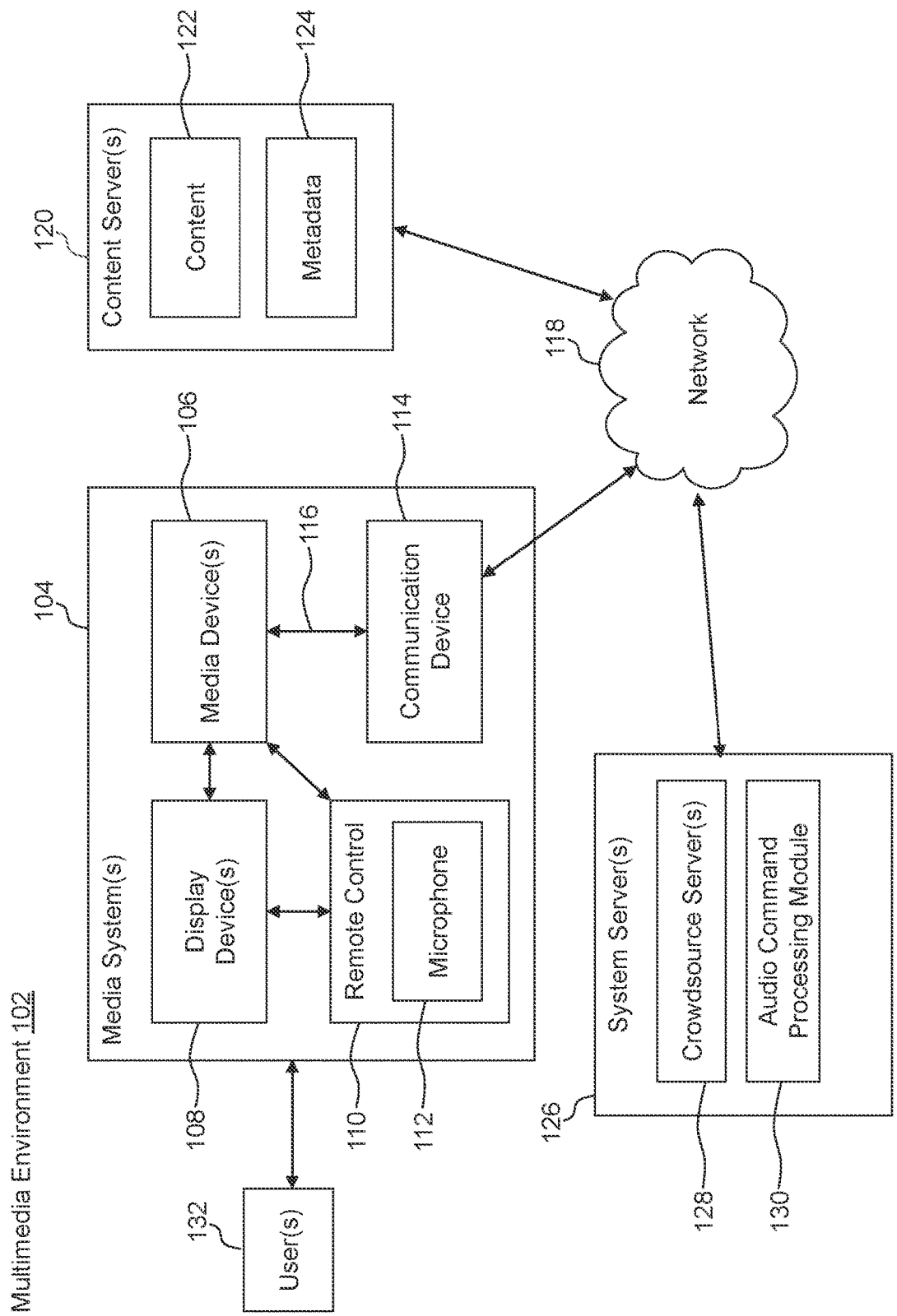
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102 that can include an RFID enabled remote control, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

The multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. The communication device 114 may include, for example, a cable modem or satellite TV transceiver. The media device 106 may communicate with the communication device 114 over a link 116, where the link 116 may include wireless (such as WiFi) and/or wired connections.

In various embodiments, the network 118 can include, without limitation, wired and/or wireless intranet, extranet, Internet, cellular, Bluetooth™, infrared, and/or any other short range, long range, local, regional, global communications mechanism, means, approach, protocol and/or network, as well as any combination(s) thereof.

Media system 104 may include a remote control 110. The remote control 110 can be any component, part, apparatus and/or method for controlling the media device 106 and/or display device 108, such as a remote control, a tablet, a laptop computer, an smartphone, a wearable device, on-screen controls, integrated control buttons, audio controls, or any combination thereof, to name just a few examples. In an embodiment, the remote control 110 wirelessly communicates with the media device 106 and/or display device 108 using cellular, Bluetooth™, infrared, etc., or any combination thereof. The remote control 110 may include a microphone 112, which is further described below. According to some embodiments, and as discussed in more detail below, remote control 110 can be an RFID enabled remote control.

The multimedia environment 102 may include a plurality of content servers 120 (also called content providers, channels or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 includes data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to the content 122. Metadata 124 may also or alternatively include one or more indexes of content 122, such as but not limited to a trick mode index.

The multimedia environment 102 may include one or more system servers 126. The system servers 126 may operate to support the media devices 106 from the cloud. It is noted that the structural and functional aspects of the system servers 126 may wholly or partially exist in the same or different ones of the system servers 126.

The media devices 106 may exist in thousands or millions of media systems 104. Accordingly, the media devices 106 may lend themselves to crowdsourcing embodiments and, thus, the system servers 126 may include one or more crowdsource servers 128.

For example, using information received from the media devices 106 in the thousands and millions of media systems 104, the crowdsource server(s) 128 may identify similarities and overlaps between closed captioning requests issued by different users 132 watching a particular movie. Based on such information, the crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, the crowdsource server(s) 128 may operate to cause closed captioning to be automatically turned on and/or off during future streamings of the movie.

The system servers 126 may also include an audio command processing module 130. As noted above, the remote control 110 may include a microphone 112. The microphone 112 may receive audio data from users 132 (as well as other sources, such as the display device 108). In some embodiments, the media device 106 may be audio responsive, and the audio data may represent verbal commands from the user 132 to control the media device 106 as well as other components in the media system 104, such as the display device 108.

In some embodiments, the audio data received by the microphone 112 in the remote control 110 is transferred to the media device 106, which is then forwarded to the audio command processing module 130 in the system servers 126. The audio command processing module 130 may operate to process and analyze the received audio data to recognize the user 132's verbal command. The audio command processing module 130 may then forward the verbal command back to the media device 106 for processing.

Figure 2:
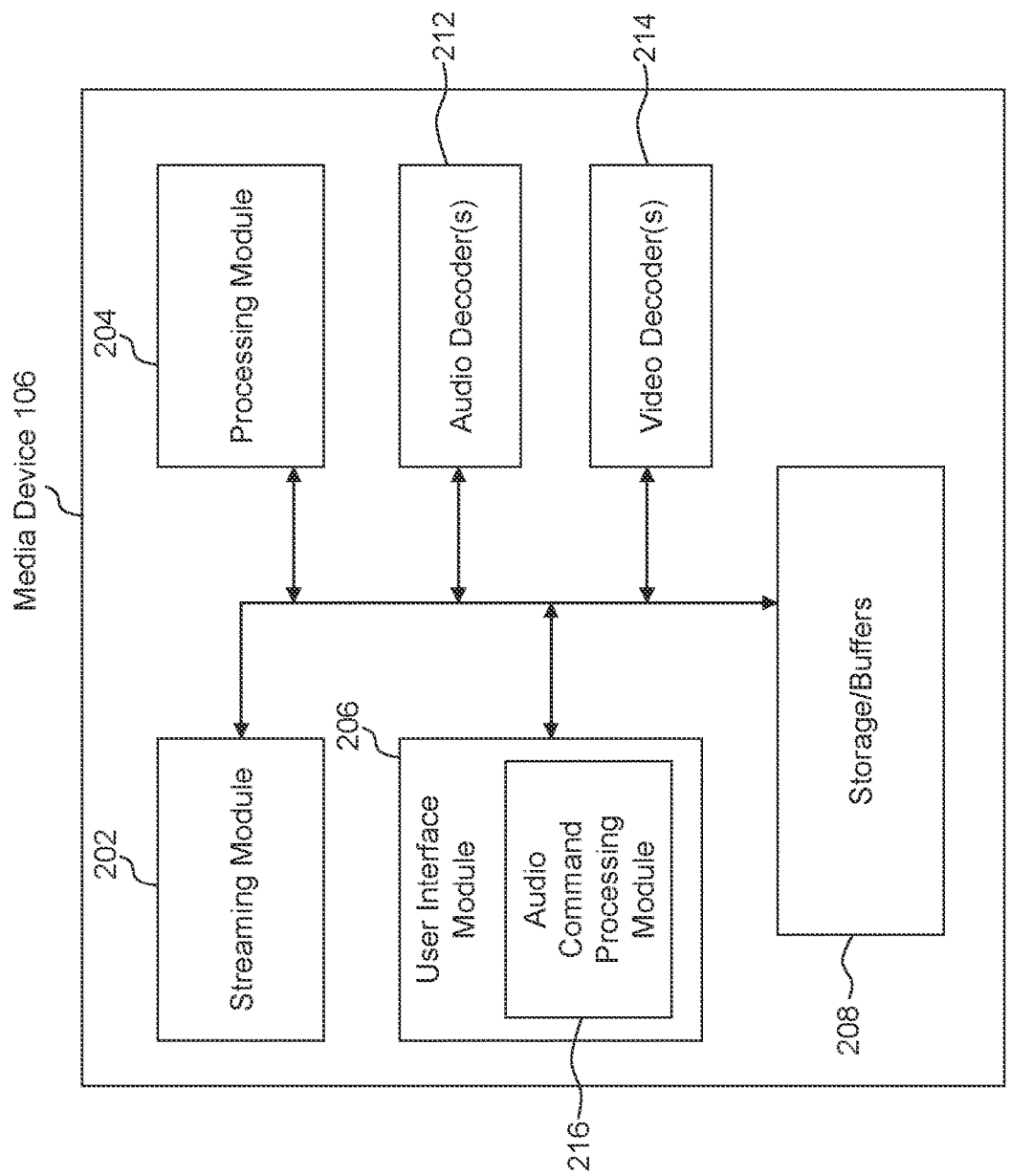
FIG. 2 illustrates a block diagram of a streaming media device, according to some embodiments.

In some embodiments, the audio data may be alternatively or additionally processed and analyzed by an audio command processing module 216 in the media device 106 (see FIG. 2). The media device 106 and the system servers 126 may then cooperate to pick one of the verbal commands to process (either the verbal command recognized by the audio command processing module 130 in the system servers 126, or the verbal command recognized by the audio command processing module 216 in the media device 106).

FIG. 2 illustrates a block diagram of an example media device 106, according to some embodiments. Media device 106 may include a streaming module 202, processing module 204, storage/buffers 208, and user interface module 206. As described above, the user interface module 206 may include the audio command processing module 216.

The media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmv, wma, asf), WEBM, FLV, AVI, QuickTime, HDV, MXF (OPla, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, the user 132 may interact with the media device 106 via, for example, the remote control 110. For example, the user 132 may use the remote control 110 to interact with the user interface module 206 of the media device 106 to select content, such as a movie, TV show, music, book, application, game, etc. The streaming module 202 of the media device 106 may request the selected content from the content server(s) 120 over the network 118. The content server(s) 120 may transmit the requested content to the streaming module 202. The media device 106 may transmit the received content to the display device 108 for playback to the user 132.

In streaming embodiments, the streaming module 202 may transmit the content to the display device 108 in real time or near real time as it receives such content from the content server(s) 120. In non-streaming embodiments, the media device 106 may store the content received from content server(s) 120 in storage/buffers 208 for later playback on display device 108.

RFID Enabled Remote Control

The RFID enabled remote control (also referred to as an RFID enabled remote control device) may allow the users (e.g., users 132) to easily enter payment information (e.g., credit card information, digital wallet information, or the like) by tapping the users' credit card and/or digital wallet (e.g., the digital wallet on an smartphone) to the RFID enabled remote control.

The RFID enabled remote control can enable the users to securely enter payment information to one or more of media devices (e.g., the media device(s) 106), to system servers (e.g., the system server(s) 126), to payment servers, or the like. The users can enter the payment information in a convenient and secure manner. As one example, and as discussed in more detail below, a user can navigate using the RFID enabled remote control and the media device to an add payment method section (and/or a one-time payment section) displayed on a display device (e.g., the display device 108). The user can select a method for entering payment information on the displayed screen. For example, the user can choose an option to tap a card on the RFID enabled remote control as the method to enter the payment information. In an optional example, a visual display on the display device can demonstrate the method to use the RFID enabled remote control to enter the payment information. For example, the visual display can demonstrate how to tap a credit card or a smartphone on the RFID enabled remote control while the RFID enabled remote control generate a sound (e.g., beeps) and/or a light (e.g. flashes). The user can tap their credit card and/or smartphone to the RFID enabled remote control. The payment information is transferred from the credit card and/or smartphone to the RFID enabled remote control. The RFID enabled remote control then transmits the payment information to the media device. In an optional example, the media device can authenticate the user before transmitting the payment information to, for example, the system server. The system server can be configured to generate a secure token based on the payment information.

It is noted that although some embodiments are discussed with respect to the RFID enabled remote control (also referred to as RFID enabled remote control device) including an RFID reader module, the embodiments of this disclosure are not limited to these examples and other devices can include the RFID reader module. For example, one or more devices such as display devices (e.g., the display device 108), media devices (e.g., the media device 106), smartphones, laptops, computers, tablets, kitchen appliances, cameras, door bells, different sensors, and the like can include an RFID reader module. Also, it is noted that although some embodiments are discussed with respect to paying for content, the embodiments of this disclosure are not limited to these examples and can be used for payment for other services and/or items.

Figure 3:
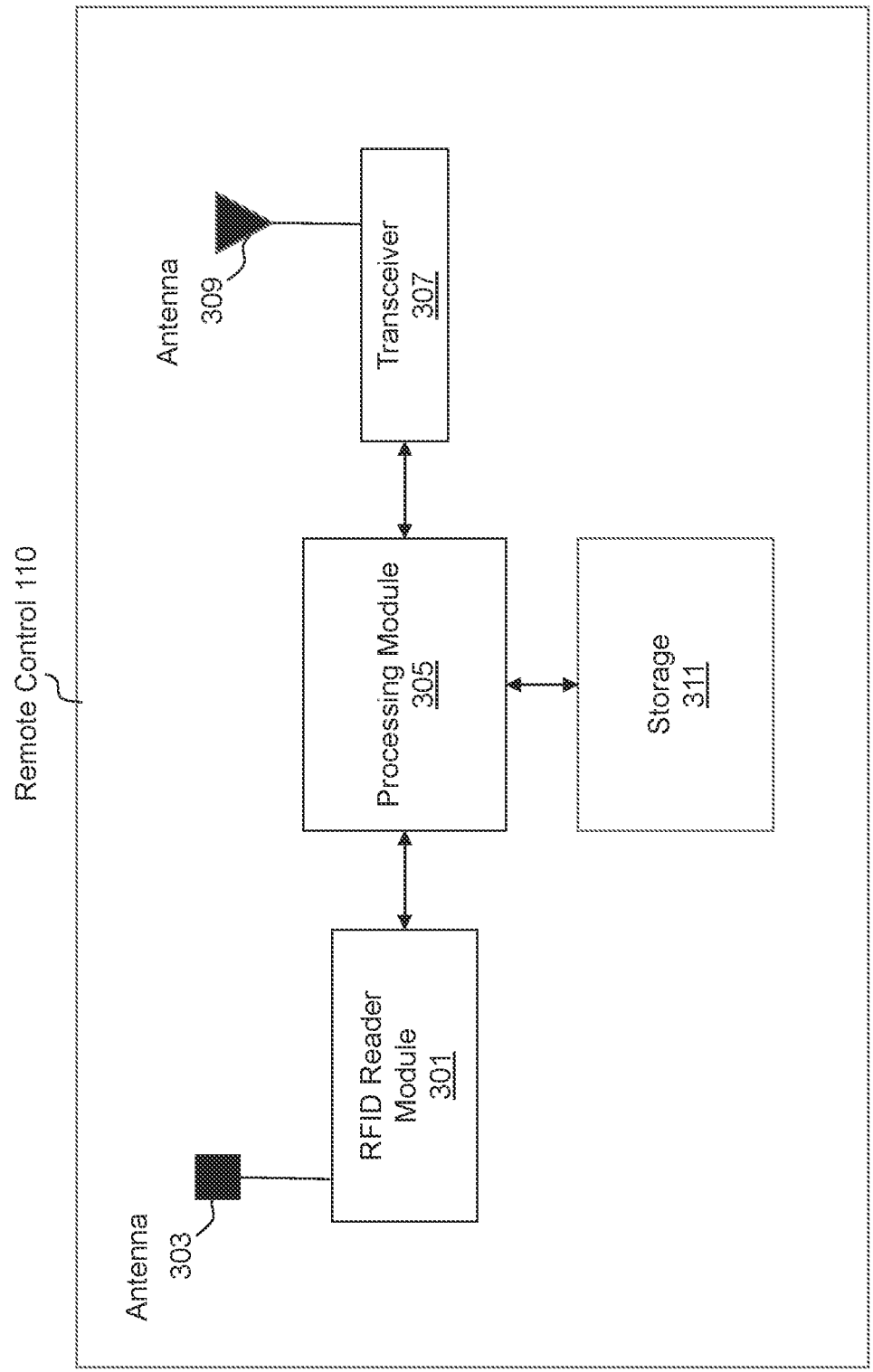
FIG. 3 illustrates a block diagram of an example remote control, according to some embodiments.

FIG. 3 illustrates a block diagram of an example remote control, according to some embodiments. The remote control 110 of FIG. 3 can be the remote control 110 of FIG. 1. The remote control 110 can include RFID reader module 301, antenna 303, processing module 305, transceiver 307, antenna 309, and storage 311. Remote control 110 can include additional or fewer components. The remote control 110 is also referred herein as the RFID enabled remote control 110 (and/or the RFID enabled remote control device 110).

The remote control 110 can include one or more RFID reader modules 301. The RFID reader module 301 can be configured to communicate with one or more RFID tags to receive information and/or data (herein referred to as information) stored at the RFID tags. The RFID tags can be associated with a credit card, with a user equipment such as a mobile device (e.g., an smartphone), with an identification card, with a tracking device, or the like.

The RFID reader module 301 can include an antenna and a transceiver. For example, the RFID reader module 301 can include and/or be coupled to the antenna 303. Although the transceiver associated with the RFID reader module 301 is not shown in FIG. 3, the RFID reader module 301 can include and/or be coupled to one or more transceivers. The RFID reader module 301 can send a signal (e.g., an interrogator signal) to the RFID tag using the transceiver of the RFID reader module 301 and through the antenna 303 of the RFID reader module 301. The RFID reader module 301 can use the transmitted signal to activate the RFID tag. Then, the RFID reader module 301 can receive the information and/or data from the RFID tag through the antenna 303 of the RFID reader module 301 and using the transceiver of the RFID reader module 301.

Different combination of active/passive RFID tag and active/passive RFID reader module 301 can be used. For example, the RFID reader module 301 can be a passive RFID reader module and the RFID tag can be an active RFID tag. In some examples, the RFID reader module 301 can be an active RFID reader module and the RFID tag can be a passive RFID tag. In some examples, the RFID reader module 301 can be an active RFID reader module and the RFID tag can be also be an active RFID tag.

The information received by the RFID reader module 301 can include payment information. The payment information can include any information used for paying for streaming content, subscriptions, merchandise, or the like. For example, the payment information can include credit card information such as, but not limited to, credit card number, expiration date, security codes, billing address, account number, routing number, time and date of transaction, a terminal identifier, one or more reference numbers, a digital token, or the like. The aspects of this disclosure are not limited to these examples and can include other payment information. According to some embodiments, the information received by the RFID reader module 301 can include payment information that are encrypted. The encrypted payment information can be stored on the RFID tag.

The remote control 110 can transmit the information to the media device (e.g., the media device 106 of FIG. 1). The media device can transmit the received information (from the remote control 110) to a system server (e.g., the system server 126 of FIG. 1). The information (e.g., the payment information) can be added to a user profile for current and/or future payments. Additionally, or alternatively, the information (e.g., the payment information) can be used for one-time payment. The user profile can include a user account associated with the media device 106 and/or with the display device 108.

The remote control 110 can transmit the information (e.g., the payment information) that the remote control 110 receives to the media device without further encrypting the information. For example, the remote control 110 can receive the encrypted payment information from the RFID tag, and the remote control 110 can transmit the encrypted payment information without any further encryption to, for example, the media device. Additionally, or alternatively, the remote control 110 can receive the payment information (encrypted or not) and can encrypt the payment information before transmitting the encrypted payment information to, for example, the media device. For example, the remote control 110 can use the processing module 305 to encrypt (or further encrypt) the payment information received from the RFID tag.

The processing module 305 can be coupled to storage 311 to retrieve and/or store encryption information at the storage 311 that is used for encrypting and/or decrypting the payment information. Additionally, or alternatively, the processing module 305 can use the storage 311 to store and/or retrieve the payment information. The processing module 305 can include one or more processors. The storage 311 may include random access memory (RAM) and/or cache, and may include control logic (e.g., computer software) and/or data. The storage 311 may include other storage devices or memory such as, but not limited to, a hard disk drive and/or a removable storage device/unit.

The remote control 110 can use the transceiver 307 and the antenna 309 to transmit the payment information (received from the RFID tag) to the media device (e.g., the media device 106 of FIG. 1), to the system server (e.g., the system server 126 of FIG. 1), to a content server (e.g., the content server 120 of FIG. 1), to a payment server, or the like.

The transceiver 307 may transmit and receive communications signals that support the RFID enabled remote control of this disclosure. The transceiver 307 may be coupled to the antenna 309. The antenna 309 may include one or more antennas that may be the same or different types. The transceiver 307 may allow the remote control 110 to communicate with other devices (e.g., the media device and/or the system server) that may be wired and/or wireless. In some examples, the transceiver 307 can include processors, controllers, radios, sockets, plugs, buffers, and like circuits/devices used for connecting to and communication on networks. Although one transceiver 307 is illustrated, the remote control 110 can include any number of transceivers.

The transceiver 307 can include a cellular subsystem, a WLAN subsystem, and/or a Bluetooth™ subsystem, each including its own radio transceiver and protocol(s). In some implementations, the transceiver 307 can include more or fewer systems for communicating with other devices. In some examples, the transceiver 307 can include one or more circuits (including a cellular transceiver) for connecting to and communicating on cellular networks. The cellular networks can include, but are not limited to, 3G/4G/5G/6G networks such as Universal Mobile Telecommunications System (UMTS), Long-Term Evolution (LTE), and the like. Additionally, or alternatively, the transceiver 307 can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. Additionally, the transceiver 307 can include one or more circuits (including a WLAN transceiver) to enable connection(s) and communication over WLAN networks such as, but not limited to, networks based on standards described in IEEE 802.11. The remote control 110 can include infrared and/or any other short range, long range, local, regional, global communications mechanism, means, approach, protocol and/or network, as well as any combination(s) thereof.

Figure 4:
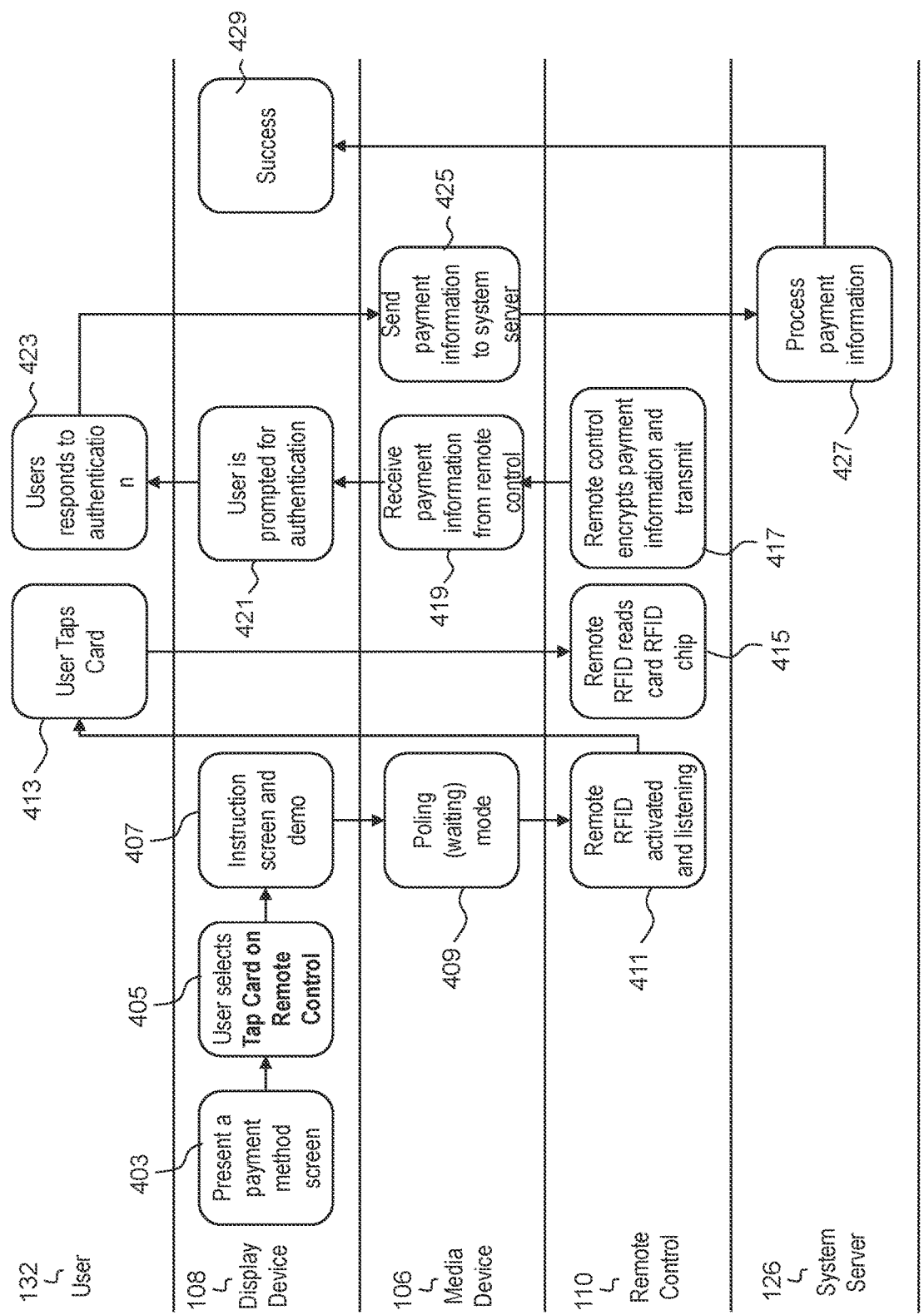
FIG. 4 illustrates one exemplary method for using the RFID enabled remote control, according to some embodiments.

FIG. 4 illustrates one exemplary method for using the RFID enabled remote control, according to some embodiments. Some of the steps of FIG. 4 may be performed simultaneously, or in a different order than shown in FIG. 4, as will be understood by a person of ordinary skill in the art. FIG. 4 may be described with reference to FIGS. 1 and 3. However, method 400 is not limited to that example embodiment.

A user (e.g., user 132) can request to pay for a content, an item, a service, or the like. Additionally, or alternatively, the user 132 can request to add payment information to, for example, the user profile for current and/or future purchases. The user can use the remote control 110 to communicate with a display device (e.g., the display device 108 of FIG. 1) and/or with the media device 106 to request for payment and/or for adding payment information.

In response to the request from the user 132 (and/or in conjunction with the request), the display device 108 can present, at 403, a screen for the user to enter the payment information. The payment information can be for a one-time payment and/or can be for addition to the user profile. The screen can include an option for taping an RFID tag to the remote control 110. The remote control 110 can be an RFID enabled remote control (also referred to as an RFID enabled remote control device). As discussed above, the user 132 can use other RFID enabled devices to perform the embodiments of this disclosure. The RFID tag can be associated with a credit card, with a user equipment such as a mobile device (e.g., an smartphone), with an identification card, with a tracking device, or the like. The user 132 can select, at 405, the option to tap the RFID tag to the remote control 110.

In an optional step 407, the display device 108 can present an instruction screen and demo. In some examples, while the instructions scree and demo are presented, the remote control 110 can generate a sound (e.g., beeps) and/or a light (e.g. flashes). In response to the user 132 selecting, at 405, the option to tap the RFID tag to the remote control 110, the media device 106 can enter a polling (e.g., waiting) mode at 409. In the poling mode, the media device 106 can wait for receiving the payment information from the remote control 110.

Additionally, or alternatively, in response to the user 132 selecting, at 405, the option to tap the RFID tag to the remote control 110, the media device 106 can activate the RFID reader module of the remote control 110 at 411. The RFID reader module of the remote control 110 (e.g., the RFID reader module 301) can be in a passive mode (e.g., a sleep mode) until the remote control 110 and/or the RFID reader module of the remote control 110 are activated by the media device 106. For example, in response to the user 132 selecting, at 405, the option to tap the RFID tag to the remote control 110, the media device 106 can send an activation signal to the remote control 110 to activate the RFID reader module of the remote control 110. The remote control 110 can receive the activation signal through, for example, transceiver 307 of FIG. 3. The activation of the RFID reader module of the remote control 110 can include transitioning the RFID reader module of the remote control 110 from the passive mode (e.g., a sleep mode) to an active mode (e.g., an awake mode).

When the user 132 selects, at 405, the option to tap the RFID tag to the remote control 110, the user 132 can activate the RFID reader module of the remote control 110 at 411. For example, the user 132 can use an option (e.g., a button) on the remote control 110 to active the RFID reader module of the remote control 110. In some embodiments, the RFID reader module of the remote control 110 can periodically switch between the passive mode and the active mode. Additionally, or alternatively, operation 411 can be optional and the RFID reader module of the remote control 110 can be active.

At 413, the user 132 can tap the RFID tag to the remote control 110. Tapping the RFID tag to the remote control 110 can include the RFID tag (or other devices having the RFID tag) touching the remote control 110. Additionally, or alternatively, tapping the RFID tag to the remote control 110 can include bringing the RFID tag (or other devices having the RFID tag) close enough to the remote control 110 without touching the remote control 110. The user 132 can bring the RFID tag (or other devices having the RFID tag) close to the remote control 110 such that the RFID tag is in a range where the RFID reader module of the remote control 110 can "read" the RFID tag.

At 415, the remote control 110 reads the information stored on the RFID tag. The information can include the payment information discussed above. The RFID reader module of the remote control 110 can send a signal (e.g., an interrogator signal) to the RFID tag. In response, the RFID tag can transmit the information (e.g., the payment information) to the RFID reader module of the remote control 110. For example, the RFID tag transmits a signal (e.g., a response signal) to RFID reader module of the remote control 110. The signal can include the information (e.g., the payment information).

At an optional step 417, the remote control 110 can encrypt the received payment information. At 419, the remote control 110 transmit the payment information to the media device 106. According to some embodiments, the remote control 110 can generate other data from the payment information where the data is compatible with media device 106 and/or system server 126. The remote control 110 can transmit the data generated from the payment information to the media device 106.

At an optional step 421, the media device 106 in connection with display device 108 can authenticate the user 132 to verify that the user 132 is authorized to use the RFID tag and/or to use the payment information. For example, at 421, the user 132 is prompted for authentication on display device 108. The authentication can include asking the user 132 to provide authentication information. In some examples, the authentication can include asking the user 132 to enter the zip code associated with the payment information. In some examples, the authentication can include asking the user 132 to enter a security code associated with the payment information. In some examples, the authentication can include asking the user 132 to enter a security code send to a device (e.g., a smartphone) of the user 132. In some examples, the authentication can include asking the user 132 to provide biometric information. The biometric information can include face identification (ID—facial recognition), iris recognition, retina scanning, fingerprint, voice recognition, vein recognition, or the like. In some examples, in the optional step 421, the media device 106 in connection with display device 108 can ask the user 132 for a challenge to verify that the user 132 is authorized to use the RFID tag and/or to use the payment information. The embodiments of this disclosure are not limited to these examples and can use other method to verify that the user 132 is authorized to use the RFID tag and/or to use the payment information.

At 423, the user 132 responds to the authentication request by an authentication response. In some embodiments, the user 132 can use the remote control 110 to enter the zip code, the security code, the code, the biometric information, or the like. Additionally, or alternatively, the user 132 can use other devices to enter the authentication information.

After receiving the authentication information, the media device 106 can compare the authentication information with stored information to verify that the user 132 is authorized to use the RFID tag and/or use the payment information. If the authentication is successful, the media device 106 can send the payment information to the system server 126 at 425. In some examples, the media device 106 can send the payment information to the system server 126, to the content server 120, to a payment server, or the like.

At 427, the system server 126 (or the content server 120, the payment server, or the like) can process the received payment information. In some examples, processing the payment information can include adding the payment information to the user profile associated with the user 132. In some examples, processing the payment information can include providing the payment information the purchase the user 132 requested. In some examples, processing the payment information can further include decrypting, encrypting, and/or formatting the payment information. At 429, a success screen can be shown on display device 108 to the user 132.

Although some examples of FIG. 4 are discussed with respect to the display device 108 and the media device 106, the embodiments of this disclosure can include implementations where the display device 108 and the media device 106 are part of the same device and/or are different devices.

Although some examples are discussed with using an RFID tag (e.g., associated with a credit card or with a digital wallet of a user equipment) with the RFID enabled remote control, the embodiments of this disclosure can include implementations where the RFID enabled remote control is the user equipment (e.g., a smartphone) and digital wallet of the user equipment can be used without tapping an RFID tag to the RFID enabled remote control. For example, the user equipment (e.g., a smartphone) can include an application (e.g., an app) for remote control. When the screen for the user to enter the payment information is presented at 403, the user 132 can select an option to use the payment information from the digital wallet of the user equipment. At an optional step 407, the display device 108 can present an instruction screen and demo how to use the digital wallet. The user 132 can activate the digital wallet of the user equipment to transmit the payment information to the remote control application of the user equipment. This method can continue with steps 417-429 of FIG. 4 as discussed above.

Figure 5:
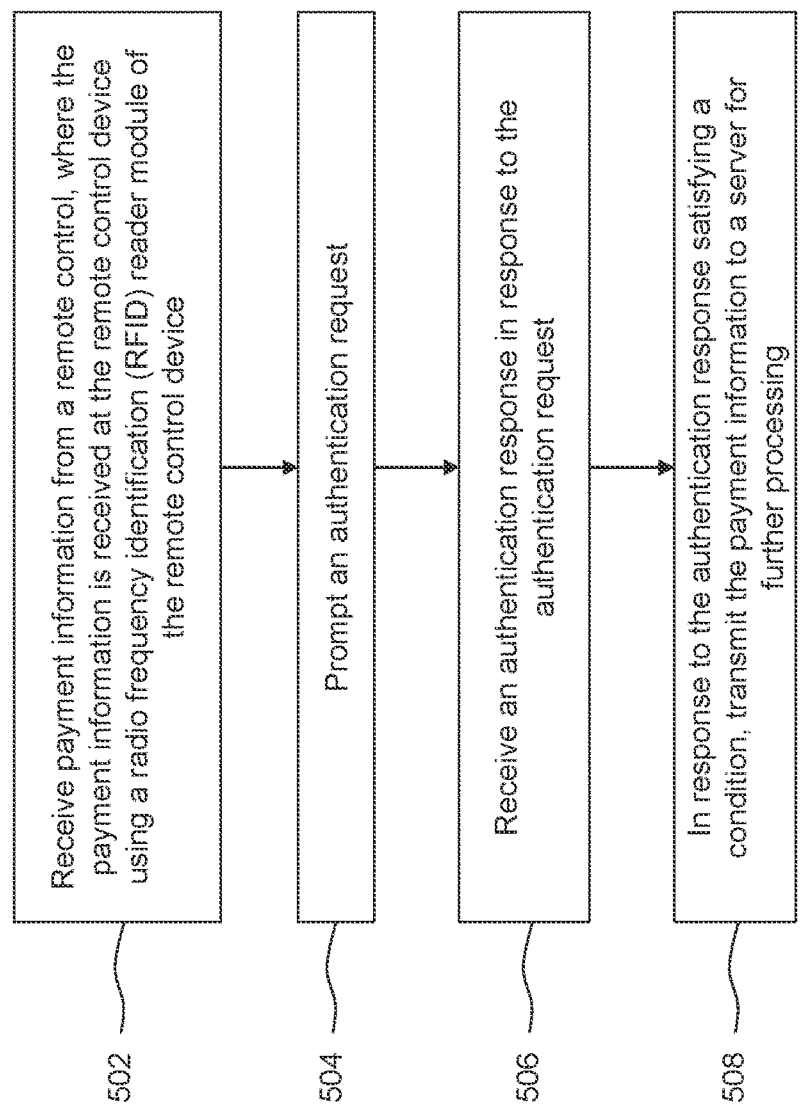
FIG. 5 is a flowchart for a method for using the RFID enabled remote control, according to an embodiment.

FIG. 5 is a flowchart for a method 500 for using the RFID enabled remote control, according to an embodiment. Method 500 can be performed by processing logic that can include hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIGS. 1-4. However, method 500 is not limited to that example embodiment.

At 502, payment information is received from a remote control. For example, a media device (e.g., the media device 106) receives the payment information from the remote control (e.g., the remote control 110). The remote control can be an RFID enabled remote control where the payment information is received at the remote control using an RFID reader module of the remote control. Additionally, or alternatively, a display device (e.g., the display device 108) receives the payment information from the remote control.

Before receiving the payment information, the method 500 can include optional operations including displaying, on a display device (e.g., the display device 108) associated with the media device, one or more payment method options and displaying, on the display device associated with the media device, an instruction screen in response to the payment method selection. The instruction screen can include an introduction screen on how to use the RFID enabled remote control.

The payment information can be associated with one or more of an RFID enabled credit card, a digital wallet of an RFID enabled device, or the like.

Before receiving the payment information, the method 500 can also include providing one or more payment method options and receiving a payment method selection. The method 500 can also include transmitting an activation signal to the remote control to active the RFID reader module in response to the payment method selection.

At 504, an authentication request is prompted. For example, in response to receiving the payment information from the remote control, the media device (and/or the display device) an prompt the authentication request to the user. The authentication request can include one or more a request for address information, a request for a security code, a request for biometric information, or the like. The authentication request can include other request for authenticating the user of the payment information.

At 506, an authentication response is received in response to the authentication request. For example, the media device (and/or the display device) can receive the authentication response from, for example, the user.

The method 500 can further include comparing the receive authentication response to stored responses. The responses can be stored at one or more of the storage 311 of FIG. 3, the storage 208 of FIG. 2, the system server 126 of FIG. 1, the content server 120 of FIG. 1, or the like.

At 508, in response to the authentication response satisfying a condition, the payment information is transmitted to a server for further processing. For example, if the authentication response matches a stored response (e.g., the user of the payment information is authorized to use the payment device (e.g., RFID enabled credit card, a digital wallet of an RFID enabled device, or the like)), then the condition is satisfied and the media device can transmit the payment information to the server for further processing. The method 500 can also include encrypting the payment information before transmitting the payment information to the server for further processing. The server can include one or more of content server 120, system server 126, a payment server, a processing server, or the like.

However, in response to the authentication response not satisfying the condition (e.g., the authentication response does not match any a stored responses), a failure message is displayed on the display device associated with the media device.

Although some aspects of this disclosure are discuss with respect to using the RFID remote control for communicating payment information for content, services, products, or the like, some examples of this disclosure can be used for authentication of a user of the media device and/or the display device. For example, the aspects of this disclosure can be used for age identification of a user. For example, the user can use an RFID tag associated with, for example, a credit card, an identification card, or the like with the RFID enabled remote control to verify that user's age and whether the user can view a content based on the user age. The systems and methods of this disclosure can be used for other verification and/or authentication purposes.

Example Computer System

Figure 6:
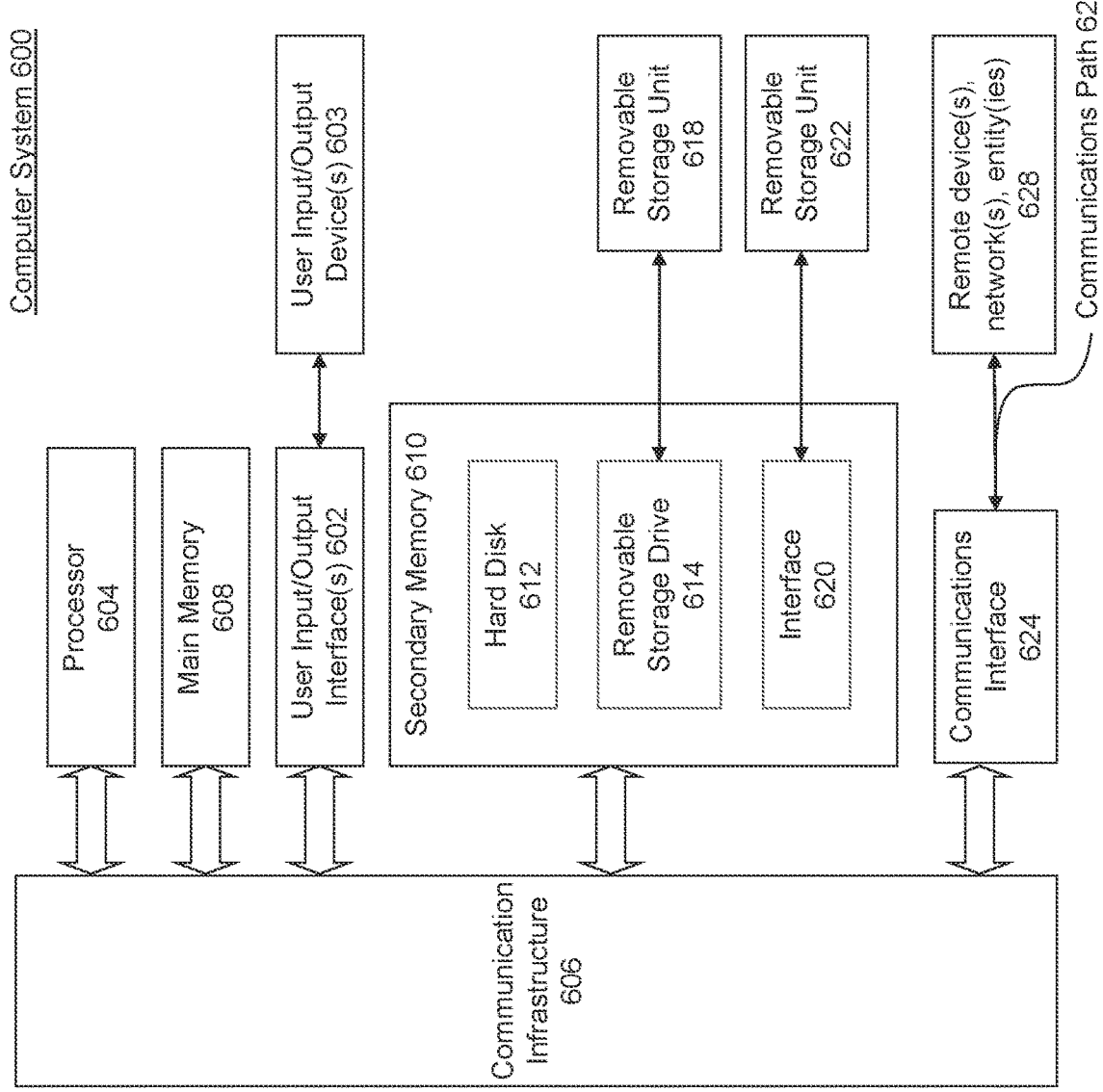
FIG. 6 illustrates an example computer system useful for implementing various embodiments.

Various embodiments may be implemented, for example, using one or more well-known computer systems, such as computer system 600 shown in FIG. 6. For example, the media device 106 may be implemented using combinations or sub-combinations of computer system 600. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

Example Remote Control

Various embodiments may be implemented, for example, using one or more computer systems, such as computer system 600 shown in FIG. 6, configured in an embedded system for efficient power consumption in a handheld form factor. For example, in one embodiment, remote control 700 (also referred to as remote control device 700) may be implemented using combinations or sub-combinations of computer system 600, including at least one processor 604 and memory 608. According to some embodiments, the remote control 700 can be an RFID enabled remote control (also referred to as the RFID enabled remote control device) as discussed in this disclosure. For example, remote control 700 can include systems and modules discussed above, for example, with respect to FIG. 3.

Figure 7:
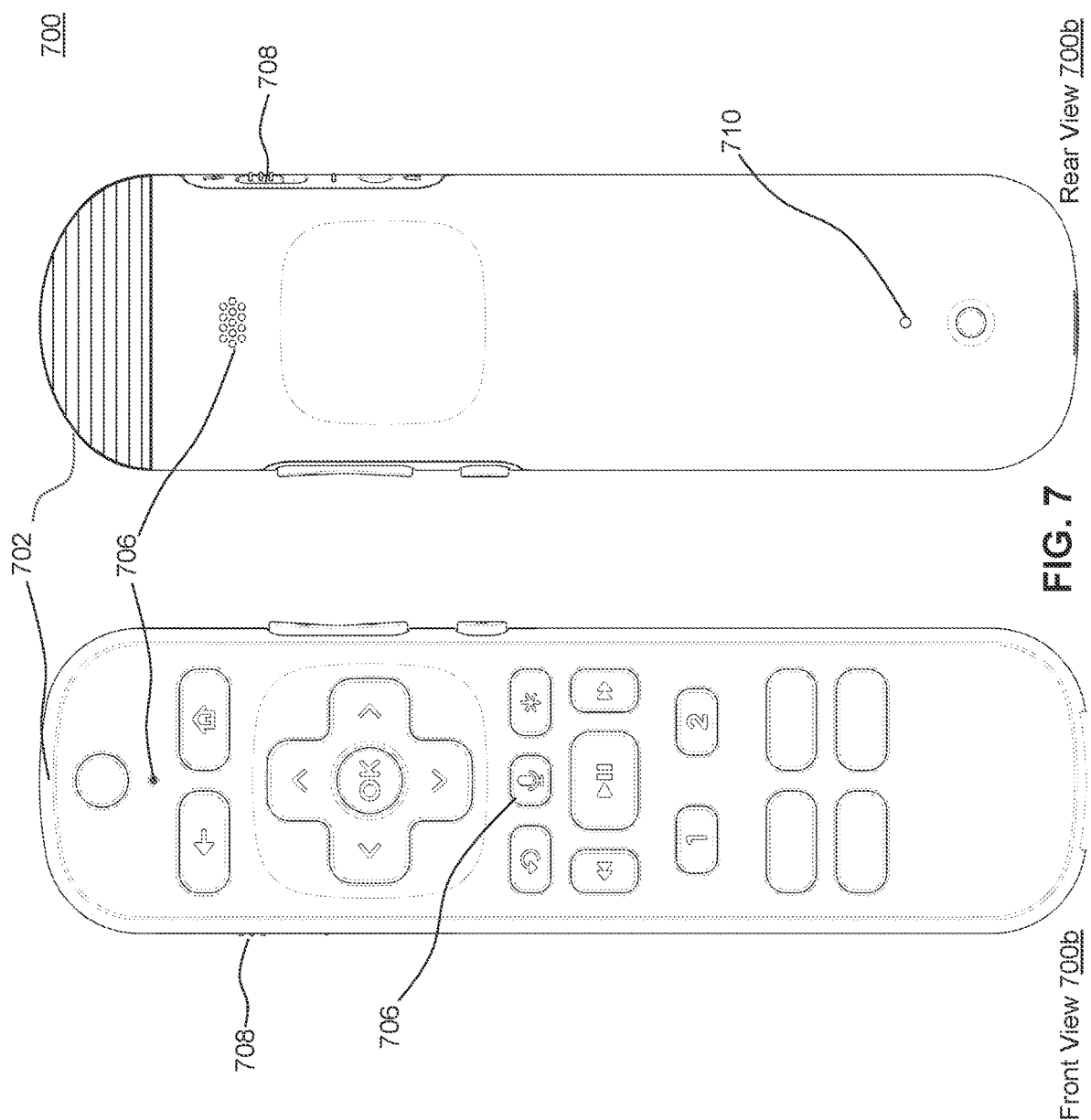
FIG. 7 illustrates an example remote control, according to some embodiments of this disclosure.

As shown in FIG. 7, with front view 700a and rear view 700b as orthogonal projections of remote control 700, an example embodiment may include an outer body molded or otherwise formed from one or more parts of any of various solid materials of varying hardness, e.g., metal, wood, glass, rubber, plastic, etc. In an embodiment of a plastic body, materials forming one or more parts may include synthetic resins such as acrylonitrile butadiene styrene (ABS), polybutylene terephthalate (PBT), ultrapolymer polyethylene (UHPE), polyphenylene sulfide (PPS), polyarylate (PAR), polyacetal (POM), polyamide (PA), polycarbonate (PC), polyether sulfone (PES), polyether ether ketone (PEEK), or the like.

Certain parts of the body may be made of different materials having different physical properties. For example, at a distal end of the body of remote control 700, a lens 702 may be integrated, snap-fit, adhesively bonded, welded, thermally fitted, or otherwise affixed to or formed in part of the body, such as a rounded end of the bottom half of the body shown by the shaded portion of the rear view 700b corresponding to lens 702. Other embodiments may have multiple such lenses 702 in any other part of the body.

Lens 702 may be composed of a material having physical properties that allow transmissibility of electromagnetic waves in and/or out through lens 702, at least at certain wavelengths. Some embodiments of lens 702 may include filters, collimators, and/or directional guides for certain wavelengths of light or other electromagnetic waves, including UV or IR beams or projections.

Disposed inside the body of remote control 700, near an inside face of lens 702, may be at least one sensor, at least one emitter, or a combination thereof. Lens 702 may be optically shaped or formed in such a way as to guide electromagnetic waves from outside the body, at different angles, toward the at least one sensor. Additionally, or alternatively, lens 702 may be optically shaped or formed in such a way as to guide electromagnetic waves produced by the at least one emitter in specific direction(s) or pattern(s) through lens 702 to the outside of the body.

Additionally, or alternatively, disposed at various positions on the front and/or rear parts of the body of remote control 700, may be any number of various holes 704 of different shapes, sizes, and groupings, in such configurations as may allow acoustic waves to pass through the body to and/or from any acoustic transducer(s) inside the body of remote control 700. Holes 704 may be positioned and/or shaped in suitable manner to allow for improved directional detection of sound by transducers such as microphones or equivalent. Additionally, or alternatively, holes 704 may be position and/or shaped in suitable manner to allow for sound output, such as for computer-generated voice notifications and/or audio playback (e.g., soundtracks of multimedia content, music, etc.).

Moreover, various embodiments may have any number of buttons disposed at least on the front, and also the rear, in some embodiments, of the body of remote control 700. The buttons may be formed of a relatively hard or soft thermoplastic resin, rubber, silicone, or similar material, and may interface with at least one membrane or other type of sensors or mechanical switches under the buttons. At least one button 706 may control input of certain sensors, such as a microphone. In some embodiments, a microphone may be on or configured to receive and process input signals regularly, but may change a configuration of how the input signals are processed, in response to a user pressing and/or holding a given button 706.

Additionally, or alternatively, at least one toggle switch 708 may be disposed on any part of the body of remote control 700, such as laterally, on at least one side, as shown in FIG. 7. Toggle switch 708 may have similar function as leaving button 706 depressed or otherwise. Toggle switch 708 may come in a variety of form factors (e.g., slider, rocker, knob, lever, tumbler, dual-inline package (DIP), push-button, etc.) and may be configured to allow a user to change any number of settings using hardware circuitry. For example, toggle switch 708 may allow a user to set a night mode, as described elsewhere herein. As another example, toggle switch 708 may be configured to operate as a hardware kill-switch for certain sensors or processing units, e.g., allowing for a privacy mode.

Further, as an alternative to, or in combination with, lens 702, at least one light pipe 710 may be used for similar purposes as lens 702, and/or may be configured to function as an indicator light, such as for aiding a user in configuring or troubleshooting other on-board processing elements, in some embodiments. In some embodiments, at the location of light pipe 710 may be a sensor or emitter flush with the body of remote control 700, allowing for less material and design complexity.

While remote control 700 as shown in FIG. 7 depicts one example embodiment, which may be used to implement remote control 110 or other aspects of the enhanced technology described herein, it is to be appreciated that other device form-factors may be used to implement at least the same functionality or equivalent functionality. Existing commercially available platforms for handheld remote control may be equipped or retrofitted with specific sensors, emitters, processors, and/or program logic configured to implement the enhanced techniques disclosed in this disclosure.

Alternatively, various general-purpose computing platforms, including handheld devices such as smartphones or tablet computers, may be sold with various environmental sensors, and may be configured or programmed at various levels of an implementation stack (hardware, firmware, system-level software, application-level software, etc.) to implement processing capabilities that may carry out the enhanced techniques described in this document and recited in the claims that follow at the end of this document. FIG. 7 is not intended to be limiting, and a remote control in accordance with an apparatus as may be recited in the claims below is not limited to a form factor resembling that shown in FIG. 7.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   displaying, by at least one computer processor of a media device on a display device associated with the media device, an instruction screen in response to receiving a payment method selection from a remote control while the remote control generates a sound or a light;
   receiving payment information from the remote control, wherein the payment information is received at the remote control using a radio frequency identification (RFID) reader module of the remote control;
   promoting an authentication request;
   receiving an authentication response from the remote control in response to the authentication request; and
   in response to the authentication response satisfying a condition, transmitting the payment information to a server for further processing.

2. The computer-implemented method of claim 1, further comprising:
   providing one or more payment method options;
   receiving the payment method selection; and
   in response to the payment method selection, transmitting an activation signal to the remote control to activate the RFID reader module,
   wherein the instruction screen includes an instruction on how to use the remote control for providing the payment information.

3. The computer-implemented method of claim 1, wherein the authentication request indicates a request for address information, a request for a security code, or a request for biometric information.

4. The computer-implemented method of claim 1, further comprising:
   in response to the authentication response not satisfying the condition, displaying a failure message on the display device associated with the media device, wherein the authentication response comprises biometric information.

5. The computer-implemented method of claim 1, further comprising:
   displaying, on the display device associated with the media device, one or more payment method options.

6. The computer-implemented method of claim 1, wherein the payment information is associated with an RFID enabled credit card.

7. The computer-implemented method of claim 1, wherein the payment information is associated with a digital wallet of an RFID enabled device and wherein the instruction screen includes an instruction on how to use the digital wallet for providing the payment information.

8. The computer-implemented method of claim 1, further comprising:
   encrypting the payment information before transmitting the payment information to the server for the further processing.

9. A non-transitory computer-readable medium having instructions stored thereon that, when executed by at least one computing device of a media device, cause the at least one computing device to perform operations comprising:
   displaying, by the media device on a display device associated with the media device, an instruction screen in response to receiving a payment method selection from a remote control while the remote control generates a sound or a light;
   receiving payment information from the remote control, wherein the payment information is received at the remote control using a radio frequency identification (RFID) reader module of the remote control;
   promoting an authentication request;
   receiving an authentication response from the remote control in response to the authentication request; and in response to the authentication response satisfying a condition, transmitting the payment information to a server for further processing.

10. The non-transitory computer-readable medium of claim 9, wherein the operations further comprise:
providing one or more payment method options;
receiving the payment method selection; and
in response to the payment method selection, transmitting an activation signal to the remote control to activate the RFID reader module.

11. The non-transitory computer-readable medium of claim 9, wherein the authentication request indicates a request for address information, a request for a security code, or a request for biometric information.

12. The non-transitory computer-readable medium of claim 9, wherein the operations further comprise:
in response to the authentication response not satisfying the condition, displaying a failure message on the display device associated with the media device, wherein the authentication response comprise biometric information.

13. The non-transitory computer-readable medium of claim 9, wherein the operations further comprise:
displaying, on the display device associated with the media device, one or more payment method options.

14. The non-transitory computer-readable medium of claim 9, wherein the payment information is associated with an RFID enabled credit card.

15. The non-transitory computer-readable medium of claim 9, wherein the operations further comprise:
encrypting the payment information before transmitting the payment information to the server for the further processing.

16. A media device, comprising:
one or more memories; and
at least one processor each coupled to at least one of the memories and configured to perform operations comprising:
displaying, on a display device associated with the media device, an instruction screen in response to receiving a payment method selection from a remote control while the remote control generates a sound or a light;
receiving payment information from the remote control, wherein the payment information is received at the remote control using a radio frequency identification (RFID) reader module of the remote control;
promoting an authentication request;
receiving an authentication response from the remote control in response to the authentication request; and
in response to the authentication response satisfying a condition, transmitting the payment information to a server for further processing.

17. The media device of claim 16, wherein the operations further comprise:
providing one or more payment method options;
receiving the payment method selection; and
in response to the payment method selection, transmitting an activation signal to the remote control to activate the RFID reader module.

18. The media device of claim 16, wherein the authentication request indicates a request for address information, a request for a security code, or a request for biometric information.

19. The media device of claim 16, wherein the operations further comprise:
in response to the authentication response not satisfying the condition, displaying a failure message on the display device associated with the media device, wherein the authentication response comprise biometric information.

20. The computer-implemented method of claim 1, wherein:
displaying the instruction screen comprises displaying the instruction screen while the remote control generates the light,
promoting the authentication request comprises prompting for biometric information comprising face identification, iris recognition, retina scanning, fingerprint scanning, voice recognition, or vein recognition, and
the computer-implemented method further comprises transmitting an activation signal to the remote control to transition the RFID reader module from a passive mode to an active mode.

* * * * *